(12) United States Patent
Kim et al.

(10) Patent No.: US 8,329,856 B2
(45) Date of Patent: Dec. 11, 2012

(54) BIODEGRADABLE POLYMER MICROPARTICLES AND PREPARATION METHOD THEREOF

(75) Inventors: Gun Poong Kim, Seoul (KR); Yong Hoon Lee, Daejeon (KR); Kun Pil Lee, Daejeon (KR)

(73) Assignee: Regen Biotech Inc., Daejeon (KR)

( * ) Notice: Subject to any disclaimer, the term of this patent is extended or adjusted under 35 U.S.C. 154(b) by 0 days.

(21) Appl. No.: 13/158,798

(22) Filed: Jun. 13, 2011

(65) Prior Publication Data
US 2011/0245456 A1    Oct. 6, 2011

Related U.S. Application Data

(63) Continuation of application No. PCT/KR2010/003610, filed on Jun. 4, 2010.

(30) Foreign Application Priority Data

Jun. 5, 2009    (KR) ........................ 10-2009-0050043

(51) Int. Cl.
*C08F 6/00*    (2006.01)
(52) U.S. Cl. ........ 528/481; 528/480; 528/491; 528/497; 528/502 R; 528/502 A; 528/502 E; 528/503; 424/462; 424/489; 427/212; 427/213.36; 428/402.24; 514/963
(58) Field of Classification Search .................. 424/422, 424/426, 455, 457, 462, 489; 427/212, 213.3, 427/123.36; 428/402, 402.24; 514/963, 514/964; 528/480, 481, 482, 487, 488, 489, 528/490, 491, 494, 495, 496, 497, 498, 499, 528/501, 502 R, 502 A, 502 D, 502 E, 503; 521/40, 40.5, 42.5, 43, 44.5, 45, 45.5, 46, 521/47, 48, 48.5, 50
See application file for complete search history.

(56) References Cited

U.S. PATENT DOCUMENTS

| | | | |
|---|---|---|---|
| 5,019,400 A * | 5/1991 | Gombotz et al. | ............. 424/497 |
| 5,100,669 A | 3/1992 | Hyon et al. | |
| 5,876,756 A * | 3/1999 | Takada et al. | ................. 424/489 |
| 5,980,947 A | 11/1999 | Yamakawa et al. | |
| 6,020,004 A | 2/2000 | Shah | |
| 6,506,410 B1 | 1/2003 | Park et al. | |
| 6,630,156 B1 | 10/2003 | Seo et al. | |

FOREIGN PATENT DOCUMENTS

| | | |
|---|---|---|
| JP | 04-046115 | 2/1992 |
| KR | 10-2001-0002589 A | 1/2001 |
| KR | 10-2002-0000698 A | 1/2002 |

* cited by examiner

*Primary Examiner* — Frances Tischler
(74) *Attorney, Agent, or Firm* — Edwards Wildman Palmer LLP

(57) ABSTRACT

The present invention relates to a preparation method for a biodegradable polymer microparticle and a microparticle prepared by the method. More particularly, the present invention relates to a method for preparing a polymer microparticle, wherein the method includes the steps of: dissolving a biodegradable polyester-based polymer in DMSO (Dimethyl Sulfoxide); spraying the solution in a low temperature hydrocarbon solution to provide a frozen DMSO microparticle; adding the microparticle in a low temperature salt aqueous solution to dissolve DMSO; and removing salt. The present invention provides a method for preparing a novel polymer microsphere which can be injected through a syringe due to excellent physical properties (such as biocompatibility, biodegradability, porosity, mechanical strength) and the microcarrier's size-adjustability, and can be easily mass-produced. The microparticle prepared by the method of the present invention may have variable sizes with biodegradability and biocompatibility, and thus can be used as a carrier for regeneration of a damaged cell or tissue by being injected into a body through a syringe.

5 Claims, 5 Drawing Sheets

BIODEGRADABLE POLYMER MICROPARTICLES AND PREPARATION METHOD THEREOF

CROSS-REFERENCE TO RELATED APPLICATION

This application is a continuation of PCT/KR2010/003610 filed on Jun. 4, 2010, which claims the benefit of Korean Application No. 10-2009-0050043 filed Jun. 5, 2009, the entire contents of which applications are incorporated herein by reference.

TECHNICAL FIELD

The present invention relates to a biodegradable polymer microparticle and a preparation method thereof. More particularly, the present invention relates to a method for preparing a polymer microparticle, wherein the method includes the steps of: dissolving a biodegradable polyester-based polymer in DMSO (Dimethyl Sulfoxide); spraying the solution in a low temperature hydrocarbon solution to provide a frozen DMSO microparticle; adding the microparticle in a low temperature salt aqueous solution to dissolve DMSO; and removing salt.

BACKGROUND ART

A porous biodegradable polymer scaffold is widely used as a matrix for regeneration of various tissues. The scaffold requires a porous structure having a high interconnectivity between pores so as to achieve a sufficient cell adhesion density and to facilitate supply of nutrition and oxygen for cell proliferation and cell differentiation.

There are various methods for preparing a porous biodegradable polymer scaffold. From among the methods, a porogen leaching method is most widely used. In the method, as the porogen, various particles such as salt, foaming salt, carbohydrate, or hydrocarbon wax may be utilized, and from a polymer/solvent/porogen mixture, porogen is selectively dissolved or foamed to form pores. In addition, there are other methods, such as emulsification/freeze-drying, phase separation, expansion of critical liquid phase, three-dimensional inkjet printing (A. G. Mikos, G. Sarakinos, S. M. Leite, J. P. Vacanti, R. Langer, Biomaterials, 14 (1993) 323-330; Z. Ma, C. Gao, Y. Gong, J. Shen, J. Biomed. Mater. Res. 67B (2003) 610-617; A. Park, B. Wu, L. G. Griffith, J. Biomater. Sci. Polym. Ed. 9 (1998) 89-110).

Such a porous polymer scaffold induces adhesion and differentiation of a cell, and thus may be usefully utilized for regeneration of bone, cartilage, and liver. However, such a scaffold is transplanted into a body through a surgical operation, thereby imposing a physical/economical burden on a patient. Accordingly, in order to minimize the inconvenience of a patient, a method for injecting a biodegradable polymer scaffold through a syringe has been developed. In this method, a polymer liquid including cells is injected so that a hydrogel can be formed through photocrosslink or sol-gel (J. j. Marler, A. Guha, J. Rowley, R. Koka, D. Monney, J. Upton, J. p. Vacanti, Plast. Reconstr. Surg. 105 (2000) 2049-2058; S. He, M. J. Yaszemski, A. W. Yasko, P. S. Engel, A. G. Mikos, Biomaterials, 21 (2000) 2389-2394).

However, such a hydrogel cannot provide an ideal environment for a cell required to be attached on a solid surface, and cannot protect cells contained therewithin due to its low mechanical strength. In order to solve such a disadvantage, a wide range of natural/synthetic microparticles, such as Culti-spher (a microparticle prepared by a porous structural gelatin), are used for adhesion-dependent animal cell culture. However, they have a disadvantage in that biocompatibility is low, and mechanical strength is not satisfactory.

A currently used method for preparing microparticles for injection is an emulsification-solvent evaporation method. Especially, in a W/O/W double emulsification method, two emulsification steps are carried out. According to the stability of W/O emulsion in the first emulsification step, the porous structure is determined. The emulsion has a disadvantage in that its preparation is difficult, because it is thermodynamically unstable, and thus an aqueous phase and an organic phase show a tendency to be separated from each other through coalescence, fusion, creaming, etc. (M. Kanouni, H. L. Rosano, N. Naouli, Adv. Colloid Interface Sci. 99 (2002) 229-254; A. J. Webster, M. E. Cates, Langmuir, 14 (1998) 2068-2079).

Also, there is a method for preparing a microcarrier, the method consisting a W/O/W double emulsification step, in which an organic phase having an aliphatic polyester polymer dissolved therein is added with an aqueous solution having foamable salt dissolved therein so as to form W/O emulsion, and then the emulsion is emulsified by being re-dispersed in an aqueous solution including hydrophilic surfactant (Korean Patent No. 801194). The microcarrier has characteristics such as biodegradability, a high porosity, a high interconnectivity between pores, and disadvantages such as a low mechanical strength, difficulty in mass production.

Accordingly, it has been constantly required to develop a method for preparing a microparticle which can be injected through a syringe due to high physical properties (such as biocompatibility, biodegradability, porosity, mechanical strength) and the microcarrier's size-adjustability, and can be easily mass-produced.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

Accordingly, the inventors of the present invention researched to develop a novel microparticle preparation method by solving the above-mentioned problems occurring in the prior art, and found a method for preparing a polymer microparticle with a high biocompatibility, a high biodegradability, a high porosity, and a high mechanical strength, wherein the method includes the steps of: dissolving a biodegradable polyester-based polymer in DMSO (Dimethyl Sulfoxide); spraying the solution in a low temperature hydrocarbon solution to provide a frozen DMSO microparticle; and adding the microparticle in a low temperature salt aqueous solution to dissolve DMSO. The present invention is based on this finding.

Accordingly, an object of the present invention is to provide a novel biodegradable polymer microparticle preparation method.

In order to accomplish this object, there is provided a method for preparing a biodegradable polymer microparticle comprising the steps of:

(a) dissolving a biodegradable polyester-based polymer in DMSO (Dimethyl Sulfoxide);

(b) spraying the solution in a hydrocarbon solution having 5 to 10 carbon atoms (C5 to C10) at a temperature of less than a melting point of DMSO to provide a microparticle;

(c) adding the microparticle in a salt aqueous solution to dissolve DMSO in the solution and remove DMSO; and (d) removing salt from the microparticle.

In order to accomplish another object of the present invention provides a biodegradable polymer microparticle prepared by the method.

DETAILED DESCRIPTION OF THE DISCLOSURE

Figure 1:
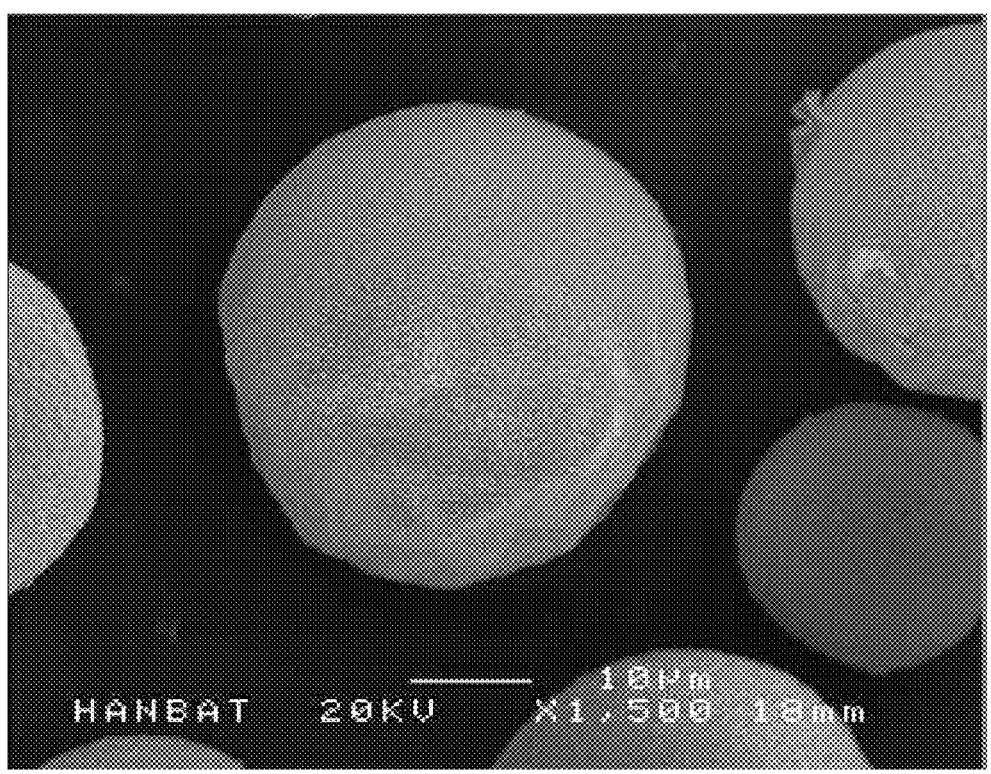
FIG. 1 is an electron microscopic photograph showing a microparticle prepared according to the method of the present invention (×1,500; polymer solution concentration: 7% spray amount: 0.2 g/min; spray rate: 5 l/min)

Hereinafter, the present invention will be described in detail.

The biodegradable polymer microparticle according to the present invention is prepared by dissolving a biodegradable polyester-based polymer in DMSO, spraying the solution in a low temperature hydrocarbon solution having 5 to 10 carbon atoms (C5 to C10) to provide a frozen DMSO microparticle, introducing the microparticle in a low temperature salt aqueous solution, dissolving DMSO, and removing salt.

In general, since organic solvents are well mixed with each other, it is impossible to prepare a microparticle by spraying one organic solvent (organic solvent A) in another organic solvent (organic solvent B). In other words, at the moment where an organic solvent A having a polymer dissolved therein is sprayed and comes in contact with another organic solvent B, the two organic solvents are mixed with each other, and thus the organic solvent A cannot be frozen. Accordingly, it is impossible to prepare a microparticle.

Meanwhile, although DMSO and hydrocarbon frequently used organic solvents, they are not mixed with each other due to a large difference in their polarities. Also, DMSO can well dissolve a polyester-based polymer, and thus can be used. Moreover, DMSO has a high melting point of 18° C., and thus can be easily frozen. Since DMSO is very well dissolved in water, it is easy to dissolve DMSO by introducing a frozen particle in water. Furthermore, since the polymer dissolved in DMSO is not dissolved in water, it is possible to prepare a microparticle in a DMSO's frozen shape. The present invention has been completed based on the above findings.

As a microparticle preparation method, an emulsification-solvent evaporation method has been conventionally mainly used. However, the method has a disadvantage in that the preparation process is complicated due to the use of a surfactant, etc., there is a limitation in adjusting the size of a microparticle, and it is not easy to adjust the porosity of the microparticle.

Meanwhile, in the present invention, since the porosity is determined according to the concentration of a polymer dissolved in DMSO, it is easy to adjust the porosity. Also, during spraying of DMSO solution having the polymer dissolved therein, the amounts of flowed solution and air can be adjusted by a valve at the outside. Thus, it is possible to easily and simply adjust the size of a microparticle. Also, since in the present invention, the microparticle is prepared by simply spraying a solution, there is an advantage in that the process is simple and the productivity is improved.

More specifically, the method for preparing a biodegradable polymer microparticle, according to the present invention, includes the steps of:

(a) dissolving a biodegradable polyester-based polymer in DMSO;

(b) spraying the solution in a hydrocarbon solution having 5 to 10 carbon atoms (C5 to C10) and a temperature of less than a melting point of DMSO to provide a microparticle;

(c) adding the microparticle in a salt aqueous solution to dissolve DMSO in the solution and remove DMSO; and (d) removing salt from the microparticle.

The step (a) is for dissolving a biodegradable polyester-based polymer in DMSO.

In the present invention, the biodegradable polyester-based polymer is an aliphatic polyester-based polymer, but the present invention is not limited thereto. Also, the biodegradable polyester-based polymer may be selected from the group consisting polylactic acid (PLA), polyglycolic acid (PGA), poly(D,L-lactic-co-glycolic acid (PLGA), polycaprolactone (PCL), poly(valerolactone), poly(hydroxy butyrate), poly (hydroxy valerate), and a derivative thereof, and may be used alone or in combinations of two or more. Preferably, the polymer may be PLA, PGA, PLGA, or a mixture thereof, and more preferably, the polymer may be PLA or PLGA. The polymer may preferably have an average molecular weight of 10,000 to 250,000. However, in the method for preparing the biodegradable polymer microparticle, according to the present invention, it is easy to prepare spherical microparticles, and to control the size of microparticles. Thus, the average molecular weight does not limit the control of a microparticle size.

In the present invention, the biodegradable polyester-based polymer solution may be dissolved in DMSO and then variously adjusted in such a manner that the corresponding polymer can have a concentration of 1% to 25% (w/v). Also, through such concentration control, it is possible to adjust the porosity of a prepared biodegradable porous microparticle. When the concentration of the polymer solution is less than 1%, the microparticle's practicality is decreased due to its low mechanical strength. When the concentration is greater than 25%, the inefficiency of spraying is caused due to its very high viscosity (e.g., formation of fiber).

In the present invention, as the organic solvent used for dissolving the aliphatic polyester-based polymer, it is necessary to use DMSO which has a high melting point, and is phase-separated from hydrocarbon.

The step (b) is for spraying the solution prepared in the step (a) in a hydrocarbon solution having 5 to 10 carbon atoms (C5 to C10) and a temperature of less than a melting point of DMSO to provide a microparticle.

In the hydrocarbon solution in the present invention, hydrocarbon has 5 to 10 carbon atoms (C5 to C10), is not frozen at a temperature less than 0° C., and is phase-separated from DMSO. Examples of the hydrocarbon may include saturated hydrocarbons, such as pentane, hexane, heptane, octane, nonane, decane, petroleum ether, and a mixture thereof. Preferably, as the hydrocarbon, n-hexane having a high volatility may be used. Due to high volatility, n-hexane may be finally easily removed during a freeze-drying process or a natural drying process. Hydrocarbons having carbon numbers less than 5 cause a difficulty in production due to very high volatility, and on the other hand hydrocarbons having carbon numbers greater than 10 have a low practicality. The hydrocarbon solution may have a temperature less than a melting point of DMSO so as to freeze DMSO, and may preferably have a temperature of less than 18° C. at 1 atmosphere. More preferably, the solution may have a temperature of −20 to 0° C. so as to facilitate the freezing of DMSO and formation of a microparticle. Most preferably, the solution may have a temperature of −10 to −5° C.

In the present invention, as a spray for spraying the aliphatic polyester-based polymer aqueous solution, a commercialized nozzle may be used. There is no limitation in the spray as long as it can control the amount of sprayed air and the amount of sprayed aliphatic polyester-based polymer solution during the spraying of the solution in a hydrocarbon solution. It can be said that in the preparation method according to the present invention, a microparticle is prepared by spraying the solution into cryogenic fluid.

In the present invention, the amount of a polymer solution to be sprayed may be variously adjusted in a range of 0.2 g/min to 20.0 g/min, and the amount of air to be sprayed may be varied in a range of 1.0 l/min (liter per minute) to 30.0 l/min. This allows the size of a microparticle to be easily controlled.

Furthermore, in this step, the microparticle sprayed in the low temperature hydrocarbon solution is settled down in a frozen state while its shape is maintained by phase-separation and freezing. Most of the frozen microparticle is DMSO used for dissolving the aliphatic polyester-based polymer. In order to remove DMSO from the microparticle, a salt aqueous solution is used for dissolving DMSO in the following step.

The step (c) is for adding the microparticle including DMSO, prepared in the step (b), in a salt aqueous solution to dissolve and remove DMSO.

In the present invention, the salt aqueous solution is preferably maintained in an unfrozen state at 0° C. or less. In order to remove DMSO, water may be used. However, for stability of a microparticle in production, if possible, a solution having a temperature of 0° C. or less is preferably used to remove DMSO. Thus, a NaCl or $CaCl_2$ aqueous solution with a concentration of 5% to 30% is preferably used. Preferably, as a salt aqueous solution, 20% or 25% sodium chloride (NaCl) solution may be used at a temperature of −20 to 0° C. When the temperature is less than −20° C., the aqueous solution is frozen and thus cannot be used. On the other hand, when the temperature is greater than 0° C., the stability of the microparticles in preparation is decreased, and prepared particles are adhered to each other. This reduces productivity.

The step (d) is for removing salt from the microparticle after DMSO has been removed from the microparticle. The salt may be removed by adding an excess amount of water, preferably of D.D.W (deionized distilled water, followed by dilution.

Through the present invention, the biodegradable polymer microparticle can be prepared. The preparation method of the present invention employs a characteristic of phase separation of DMSO (for dissolving an aliphatic polyester-based polymer) from a hydrocarbon (as a cooling organic solvent). The preparation method is much simpler and efficient and has a characteristic of a simple mass-production, compared to a conventional method. Also, it is possible to easily adjust the size of the microparticle. This allows the microparticle to be injected into a body.

The biodegradable polymer microparticle according to the present invention, as prepared above, has a diameter of 10 μm to 1000 μm. The diameter of the biodegradable polymer microparticle of the present invention may be appropriately adjusted according to the concentration of a biodegradable polyester-based polymer in a DMSO aqueous solution, and the amounts of sprayed solution and air during spraying of the solution into a hydrocarbon solution. The diameter is increased when the concentration of the biodegradable polyester-based polymer in the DMSO aqueous solution is increased, the amount of the solution sprayed into the hydrocarbon solution is increased, and the amount of the air sprayed into the hydrocarbon solution is decreased.

The biodegradable polymer microparticle according to the present invention, as described above, can be cultured in such a manner that cells can be included, and then can be utilized as an injectable cell carrier.

Accordingly, the present invention provides a method for preparing a novel polymer microsphere which can be injected through a syringe due to high physical properties (such as biocompatibility, biodegradability, porosity, mechanical strength) and the microcarrier's size-adjustability, and can be easily mass-produced. The microparticle prepared by the preparation method of the present invention may have variable sizes with biodegradability and biocompatibility, and thus can be used as a cell carrier for regeneration of a damaged cell or tissue by being injected into a body through a syringe.

EXAMPLES

Hereinafter, the present invention will be described in detail with reference to Examples below. However, the following examples are illustrative only, and the scope of the present invention is not limited thereto.

Example 1

Preparation of a Polymer Microparticle According to the Present Invention (1) 35 g of poly(D,L-lactic-co-glycolic acid (PLGA) having an average molecular weight of 110,000 and a lactic acid-glycolic acid ratio of 75:25 was dissolved in 500 ml of DMSO (Dimethyl Sulfoxide) to provide a 7% (w/v) polymer solution. The polymer solution was sprayed into n-hexane cooled to −5° C. in an amount of 0.2 g/min, with sprayed air in an amount of 5.0 l/min. Herein, the sprayed polymer solution was frozen into a spherical shape in the low-temperature n-hexane.

The frozen microparticle was collected and left in 1,000 ml of 25% (w/v) NaCl aqueous solution cooled to −20° C., for 72 hours so as to dissolve the component of DMSO. Then, through filtration, a polymer microparticle from which DMSO had been removed was obtained. The obtained microparticle was washed with 5,000 ml of distilled water, and filtrated so as to filter out the remaining DMSO and NaCl. Then, through freeze-drying, a biodegradable polymer microparticle according to the present invention was obtained.

(2) A biodegradable polymer microparticle was prepared in the same manner as described in (1) except that the polymer solution dissolved in DMSO was sprayed into n-hexane in an amount of 3.0 g/min, with sprayed air in an amount of 3.0 l/min.

(3) A biodegradable polymer microparticle was prepared in the same manner as described in (1) except that the polymer solution dissolved in DMSO was sprayed into n-hexane in an amount of 5.0 g/min, with sprayed air in an amount of 1.0 l/min.

(4) A PLGA biodegradable polyester-based polymer having an average molecular weight of 110,000 and a lactic acid-glycolic acid ratio of 75:25 was dissolved in DMSO, so that the biodegradable polyester-based polymer can have concentrations of 3.0% and 12.0%. Then, each of these polymer solutions was sprayed in an amount of 5.0 g/min, with sprayed air in an amount of 1.0 l/min. By measuring the apparent densities of the biodegradable porous microparticles prepared through concentration control of a polymer solution, the controlled porosities were compared to each other.

Example 2

Check of Physical Properties of Polymer Microparticles of the Present Invention

In order to check the properties of each of the biodegradable polymer microparticles prepared from Example 1, the size, the yield, and the apparent density of the biodegradable polymer microparticles were measured. Herein, the size of the microparticle was measured through the electron microscopic photograph, and the yield was calculated by the amount of finally obtained microparticles comparing to the amount of introduced polymer. The apparent density was measured by introducing a predetermined amount of the microcarrier into a predetermined volume of a mass cylinder, and by tapping a predetermined number of times at a predetermined rate by a densitometer.

Figure 2:
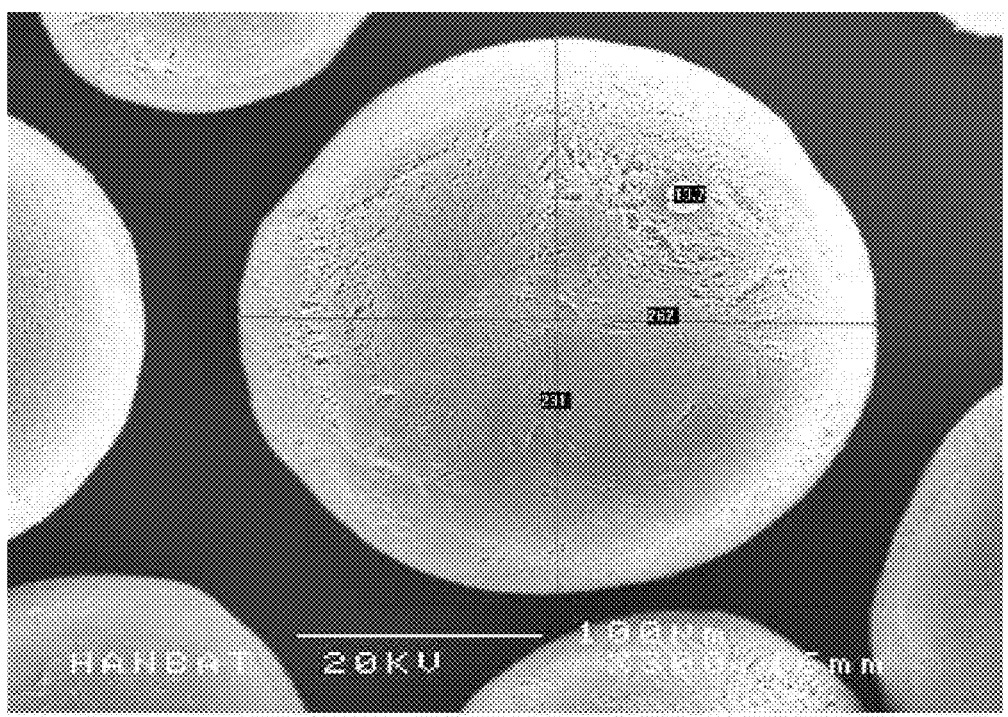
FIG. 2 is an electron microscopic photograph showing a microparticle prepared according to the method of the present invention (×300; polymer solution concentration: 7% spray amount: 3.0 g/min; spray rate: 3 l/min)
Figure 3:
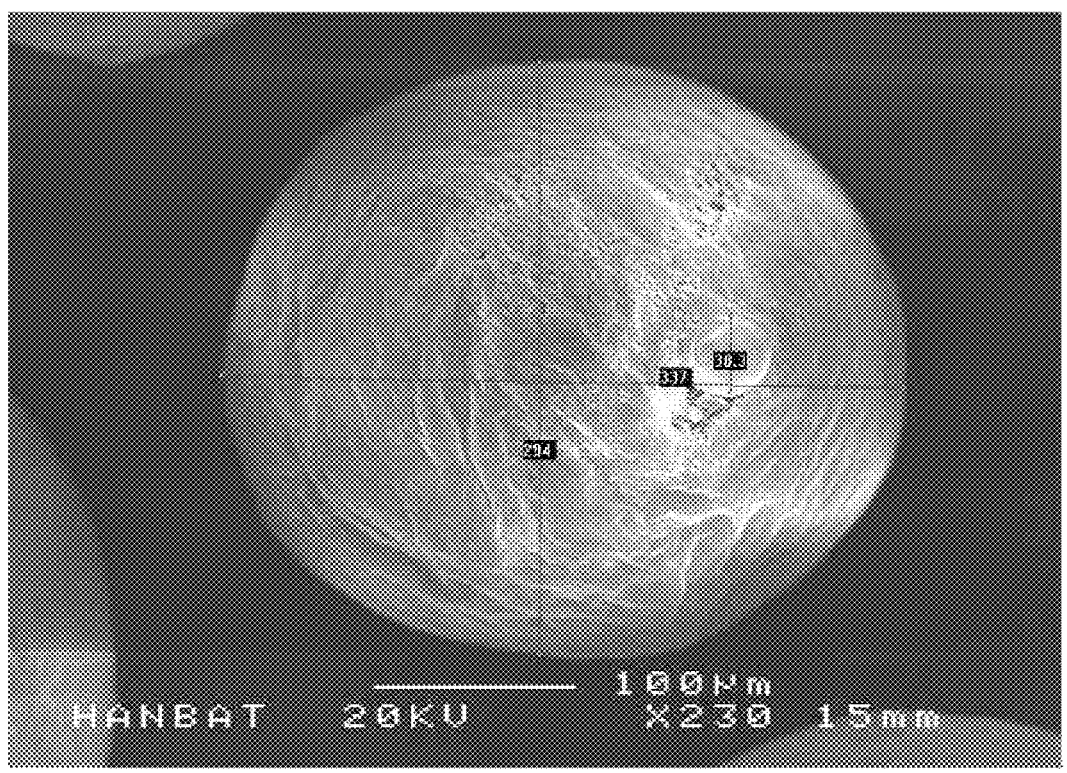
FIG. 3 is an electron microscopic photograph showing a microparticle prepared according to the method of the present invention (×230; polymer solution concentration: 7% spray amount: 5.0 g/min; spray rate: 1 l/min)
Figure 4:
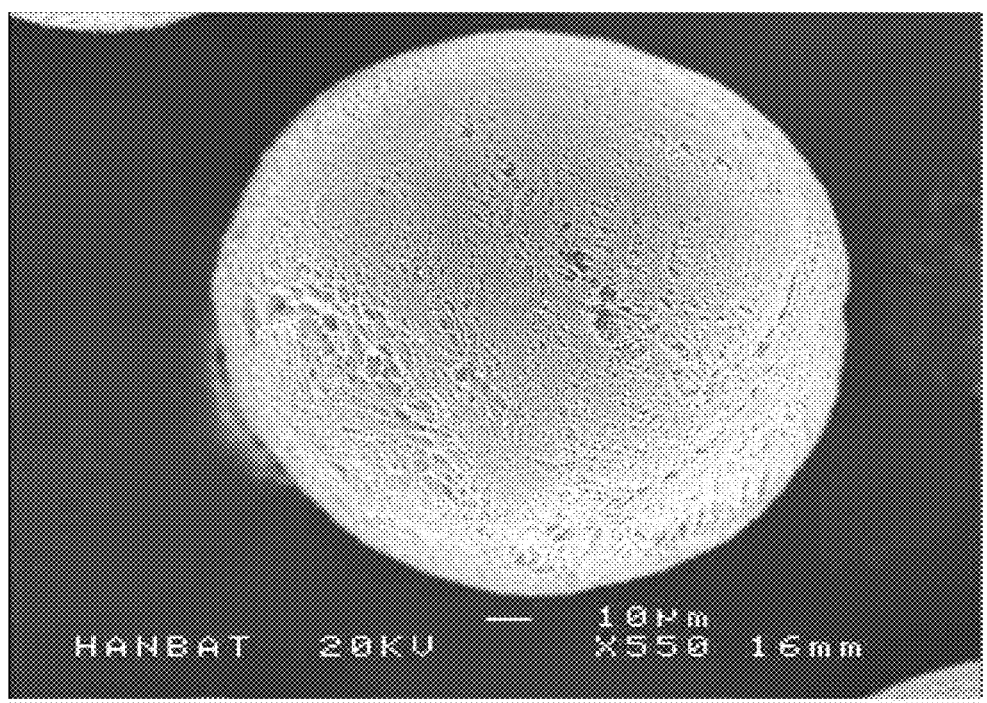
FIG. 4 is an electron microscopic photograph showing a microparticle prepared according to the method of the present invention (×550; polymer solution concentration: 3% spray amount: 3.0 g/min; spray rate: 3 l/min)
Figure 5:
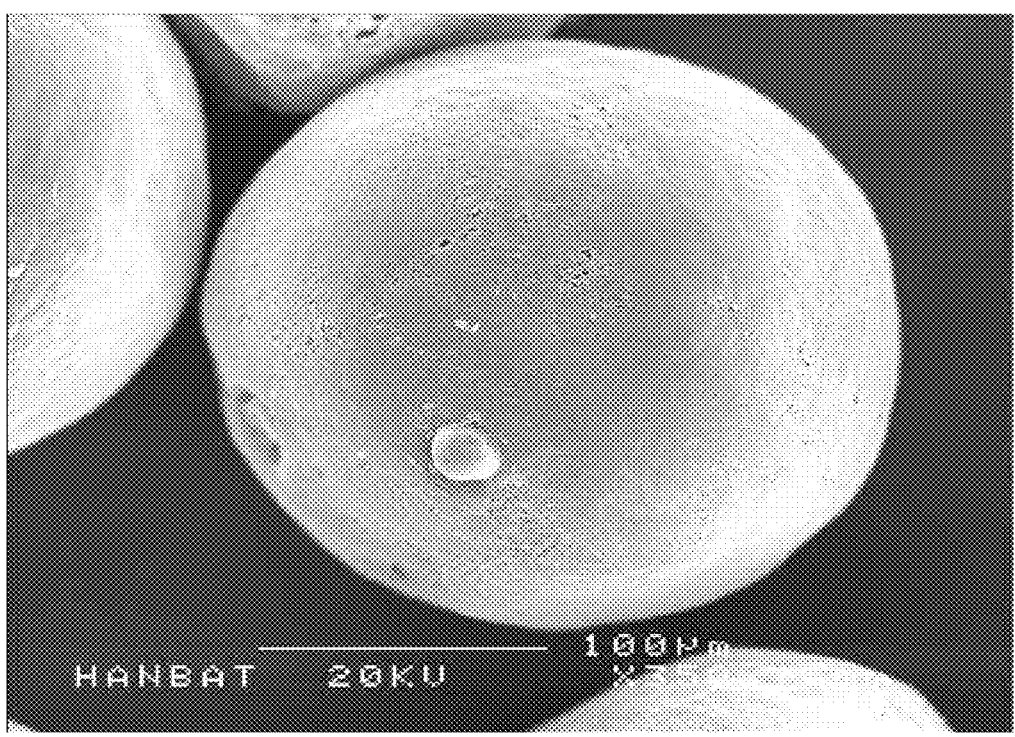
FIG. 5 is an electron microscopic photograph showing a microparticle prepared according to the method of the present invention (×350; polymer solution concentration: 12% spray amount: 3.0 g/min; spray rate: 3 l/min).

As a result, as shown in FIGS. 1 to 5, and as noted in Table 1, it can be seen that in proportion to the amount of sprayed polymer solution, and in inverse proportion to the amount of sprayed air, the size of the microparticle is increased. Also, it can be seen that as the concentration of a polymer solution increases, the apparent density increases. The size of the microparticle prepared according to the preparation method of the present invention was appropriate to be injected into the body through a cell culture. Furthermore, in view of the yield, it was determined that the microparticle has an economical efficiency.

TABLE 1

| Polymer solution Concentration (%) | Spray condition | | microparticle Size (μm) | yield (%) | Apparent density (g/ml) |
|---|---|---|---|---|---|
| | amount of sprayed polymer solution (g/min) | Amount of sprayed air (l/min) | | | |
| | 0.2 | 5 | 100 or less | 54 | 0.18 |
| 7 | 3 | 3 | 100~300 | 62 | 0.087 |
| | 5 | 1 | 300~500 | 68 | 0.071 |
| 3 | 3 | 3 | 100~300 | 59 | 0.045 |
| 12 | 3 | 3 | 100~300 | 67 | 0.13 |

As can be seen foregoing, the present invention provides a method for preparing a novel polymer microsphere which can be injected through a syringe due to high physical properties (such as biocompatibility, biodegradability, porosity, mechanical strength) and the microcarrier's size-adjustability, and can be easily mass-produced. The microparticle prepared by the preparation method of the present invention may have variable sizes with biodegradability and biocompatibility, and thus can be used as a cell carrier for regeneration of a damaged cell or tissue by being injected into a body through a syringe.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

The invention claimed is:

1. A method for preparing a biodegradable polymer microparticle, comprising the steps of:
   (a) dissolving a biodegradable polyester-based polymer in DMSO (Dimethyl Sulfoxide) to form a solution;
   (b) spraying the solution in a hydrocarbon solution having 5 to 10 carbon atoms (C5 to C10) at a temperature of higher than −20° C. to less than a melting point of DMSO to provide a microparticle, wherein the hydrocarbon solution is phase-separated from DMSO and is selected from the group consisting of pentane, hexane, heptane, octane, nonane, decane and petroleum ether;
   (c) adding the microparticle in a salt aqueous solution to dissolve the DMSO in the solution and remove the DMSO; and
   (d) removing the salt from the microparticle.

2. The method of claim 1, wherein the biodegradable polymer microparticle has 10 μm to 1000 μm in diameter.

3. The method of claim 1, wherein the biodegradable polyester-based polymer is selected from the group consisted of polylactic acid (PLA), polyglycolic acid (PGA), poly(D,L-lactic-co-glycolic acid (PLGA), polycaprolactone (PCL), poly(valerolactone), poly(hydroxy butyrate), poly(hydroxy valerate), and has average molecular weight of 10,000~250,000.

4. The method of claim 1, wherein dissolving of step (a) is dissolving the biodegradable polyester-based polymer in DMSO to a concentration of 1% to 25%.

5. The method of claim 1, wherein the salt aqueous solution is a NaCl or $CaCl_2$ aqueous solution with a concentration of 5% to 30%.

* * * * *